United States Patent [19]

Barrick

[11] Patent Number: 5,095,606
[45] Date of Patent: Mar. 17, 1992

[54] DEVICE AND METHOD FOR HEAT AND PRESSURE FORMING STAKES

[75] Inventor: James G. Barrick, Fairview Park, Ohio

[73] Assignee: Hewlett-Packard Company, Palo Alto, Calif.

[21] Appl. No.: 566,939

[22] Filed: Aug. 13, 1990

[51] Int. Cl.[5] .................. B21D 39/00; B23P 11/00
[52] U.S. Cl. ........................... 29/509; 29/243.5
[58] Field of Search .............. 29/243, 243.5, 509; 425/110, 112; 264/23, 249, 548

[56] References Cited

U.S. PATENT DOCUMENTS

| | | | |
|---|---|---|---|
| 3,111,867 | 11/1963 | Riggio | 29/243.5 |
| 3,484,935 | 12/1969 | Burns | 29/243.5 X |
| 4,312,122 | 1/1982 | Gunter | 29/243.5 X |
| 4,409,720 | 10/1983 | Boudreau | 29/243.5 X |
| 4,459,092 | 7/1984 | Hatakeyama | 425/112 |
| 4,633,559 | 1/1987 | Loren | 29/243.5 |
| 4,763,397 | 8/1988 | Tsukayama et al. | 264/249 X |
| 4,767,298 | 8/1988 | Bocchicchio et al. | 425/112 |
| 4,776,782 | 10/1988 | Murayama et al. | 264/23 X |
| 4,859,378 | 8/1989 | Wolcott | 264/23 |

Primary Examiner—Timothy V. Eley
Assistant Examiner—C. Richard Martin

[57] ABSTRACT

A heat staking tip designed to contain an electrically heated element and an outer sealing sheath for making uniform plastic weld caps out of thermal plastic studs. The tip design combines both heat and pressure in the weld cycle. The sealing sheath is able to move relative to the heating element by use of air pressure. This allows the sealing sheath to seal around the plastic studs with a uniform force while heated pressure pins within the tip assembly are forced by a press assembly against the studs. The pressure pins both melt and pack the plastic of the studs to form uniform weld caps.

9 Claims, 3 Drawing Sheets

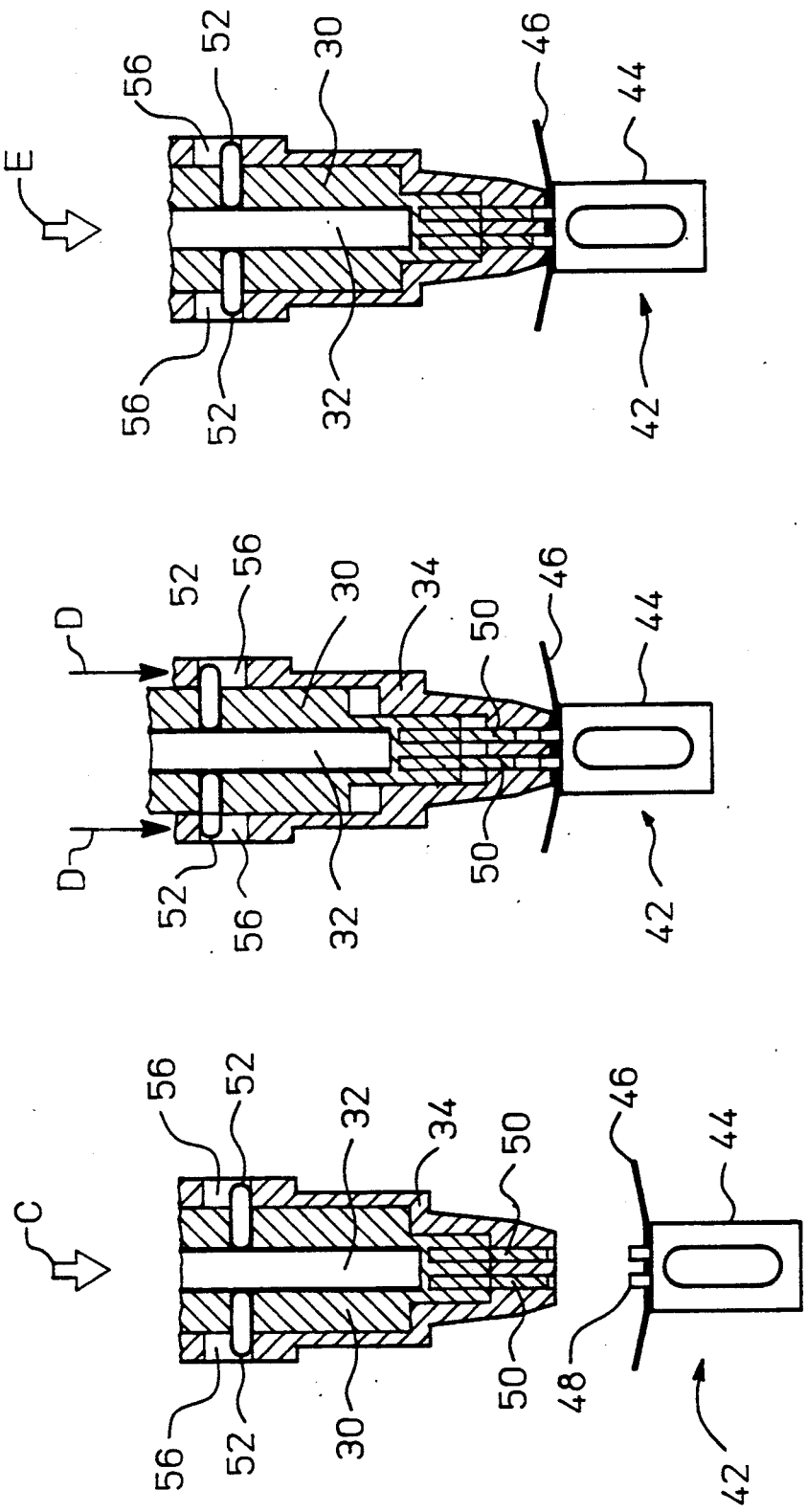

DEVICE AND METHOD FOR HEAT AND PRESSURE FORMING STAKES

TECHNICAL FIELD

The present invention relates to method and apparatus for staking formable posts to join parts together.

BACKGROUND ART

Heat staking as a means of joining parts together is well known and has been used in a variety of applications including the assembly of parts for the toy, medical and electronic industries. In general, one of the parts to be assembled is designed to include a plastic post which can be inserted through a hole or aperture in another part. The post is then permanently deformed by the generation or application of heat by some tool surface.

Ultrasonic welding is one method which is often used to deform these posts. The ultrasonic welding process produces heat by vibration. A welding tip or bell rubs against the post at a rate of more than 20,000 times/second thereby creating heat. With the appropriate combination of weld power, time and pressure this process can be used to join a variety of plastic parts, for example, the two halves of an audio cassette. When the vibration stops, melting within the weld joint ceases immediately. An ultrasonic staker is described in U.S. Pat. No. 4,859,378.

For ultrasonic welding to work, the parts must be clamped tightly to maintain alignment while the parts are subject to the vibrations of the welding process. Effective Welding can only occur if the tip can rub against the part. If the part is loose and free to move, welding will not occur. However, clamping the parts too tightly may cause damage (deformation) to the parts. Moreover, the vibrations themselves may cause misalignment of parts.

The ultrasonic welding process also tends to produce weld caps of varying diameter and shape because the plastic material is "free to flow". This leads to variable forces between the parts joined together. This is particularly critical when the parts to be joined are used to make precision electrical components such as switches. An example is an edge line microwave switch wherein a metal contactor is joined to a plastic slider. Making contactor assemblies for these switches with consistent bending forces is critical to ensuring switch reliability and is important to ensuring switch isolation performance. As a further concern with switch performance is the problem of glass fibers breaking off the stake and then interfering with electrical contacts.

Ultrasonic welding further tends to produce welds which withstand axial forces moderately well but do not tend to withstand torque very well. Thus it may be difficult to pull the two pieces apart yet be very easy to rotate the pieces about the stake. Further, weak or loose welds may result from variations in "stud" volume due to plastic molding changes or variations in depression volume due to tip wear from abrasion.

Use of heated tips is another method for welding two parts together. U.S. Pat. No. 4,767,298 discloses a device for heat staking plastic parts using this method. The device features a number of heating elements and individually programmable tips. In operation the tips are urged against the plastic posts, causing the posts to melt. The melted plastic is then free to flow as gravity and other forces dictate. This leads to weld caps which vary in size and strength. Allowing the plastic to free flow will not provide an assembly in which all of the glass fibers are contained in the weld cap thereby permitting the fibers to break off. Further, a high temperature may be required to achieve proper plastic reflow, but this high temperature may in fact degrade the performance characteristics of the material.

In U.S. Pat. No. 4,633,559, LOREN discloses a method and apparatus for staking a formable plastic post. The device relies upon physical force to form the plastic post into a desired shape. This is accomplished by clamping the device around the base of the post and thereby forming a cylindrical cavity around the post, after which a staking tool is driven into the post until the post fills the cavity. This method forms weld caps that are generally uniform in terms of size and shape, but which may vary in strength. Further, weld caps produced in this manner inherently have glass fibers which may break off and disrupt the workings of other parts due to the fibers not being contained in the weld.

In view of the above, it is an object of the present invention to provide a method and apparatus for staking in which uniform weld caps are produced.

It is another object of the present invention to provide staked weld caps which have a high resistance to torque and have few if any glass fibers to break off.

SUMMARY OF THE INVENTION

The above objects have been achieved by a novel heat staking tip design and method which combine heat and pressure to consistently form uniform weld caps. The heat staking tip is part of a staking press assembly and is designed to contain an electrical heating element within a steel heater core. The heater core contains two precision-ground steel pins at one end which are intended to transmit force directly to the plastic studs or posts to be welded. The lower portion of the heat staking tip comprises a sleeve which fits over the heater core. This sleeve, henceforth referred to as the sealing sheath, contains two precision bored holes through which the pressure pins of the heater core fit. To make a weld cap the plastic stud is received inside one of the precision holes of the sealing sheath which defines the shape of the resulting weld cap. A heated pressure pin is then driven against the stud, melting it and packing it into the desired shape.

The heat staking tip further includes a thermally insulating high-temperature plastic bushing located at the end of the heater core opposite to the pressure pins. This portion of the heat staking tip locks into the bottom of a counterbore in the tip housing and moves only as the tip housing is driven by a high-pressure air cylinder. The sealing sheath has its own high-temperature thermal insulator which also serves as a pneumatic air seal. In operation, a variable source of air pressure is introduced through the tip housing into an area just behind the insulator so that the outer sealing sheath is pressed downward independently of the inner heater core. To prevent the sealing sheath from being blown off when air pressure is applied, two dowel pins are used to restrain the sheath at its fully extended lower position.

Advantages of the present heat staking process and tip design are seen in that vibrations are not used to produce the weld. Thus, the parts tend to remain in alignment. Statistically, the present heat staking tip and method improves alignment by a factor of 8 to 10 times with respect to ultrasonic methods. Further, the present heat staking tip and method place no special demands on the clamping force provided by the assembly fixture. This simplifies the design of the assembly fixture and can reduce or eliminate damage to parts due to high clamping forces. Moreover, the present tip design ensures an even clamping force under nearly all conditions.

A further advantage and surprising result of the present heat staking process is that it inherently "seals in" glass fibers on or near the stud surface. Reinforced plastic materials naturally "skin over" when they are melted. Due to the controlled nature of the melting of the stake, a layer of plastic forms over the surface of the stake, thereby encapsulating troublesome glass fibers inside the core of the stake. This means that there is less likelihood of fibers breaking off and interfering with the workings of other parts.

Another subtle but critical advantage of the present heat staking process is that it produces parts which have a high resistance to torque. This advantage is brought about by the novel heat staking tip design which provides that the softened plastic is packed into the gaps left between the outside diameter of each stud and the inside diameter of each hole. Thus, a solid ring of plastic fills these gaps which prevents rotation or loosening of the weld while at the same time providing improved axial strength. Moreover, the sealing sheath contains any flash caused by the heat staking process.

The sealing sheath also enables the present process to produce weld caps of consistent diameter and position relative to the parts being joined. Thus, with the microwave switches described previously, uniform weld caps, in terms of diameter and position, provide consistent forces which give the metal contactor a consistent electrical resistance. This is important in switch design especially given that the contactor resistance varies exponentially with force. Accordingly, being able to produce uniform weld caps allows for the design of weld caps with which low forces are used resulting in lower contactor resistance and improved switch reliability and isolation performance.

BRIEF DESCRIPTION OF THE DRAWINGS

FIGS. 2A-C are enlarged views of the heat staking tip shown in FIG. 1, which illustrate the operation of the tip in accord with the present invention.

BEST MODE FOR CARRYING OUT THE INVENTION

Figure 1:
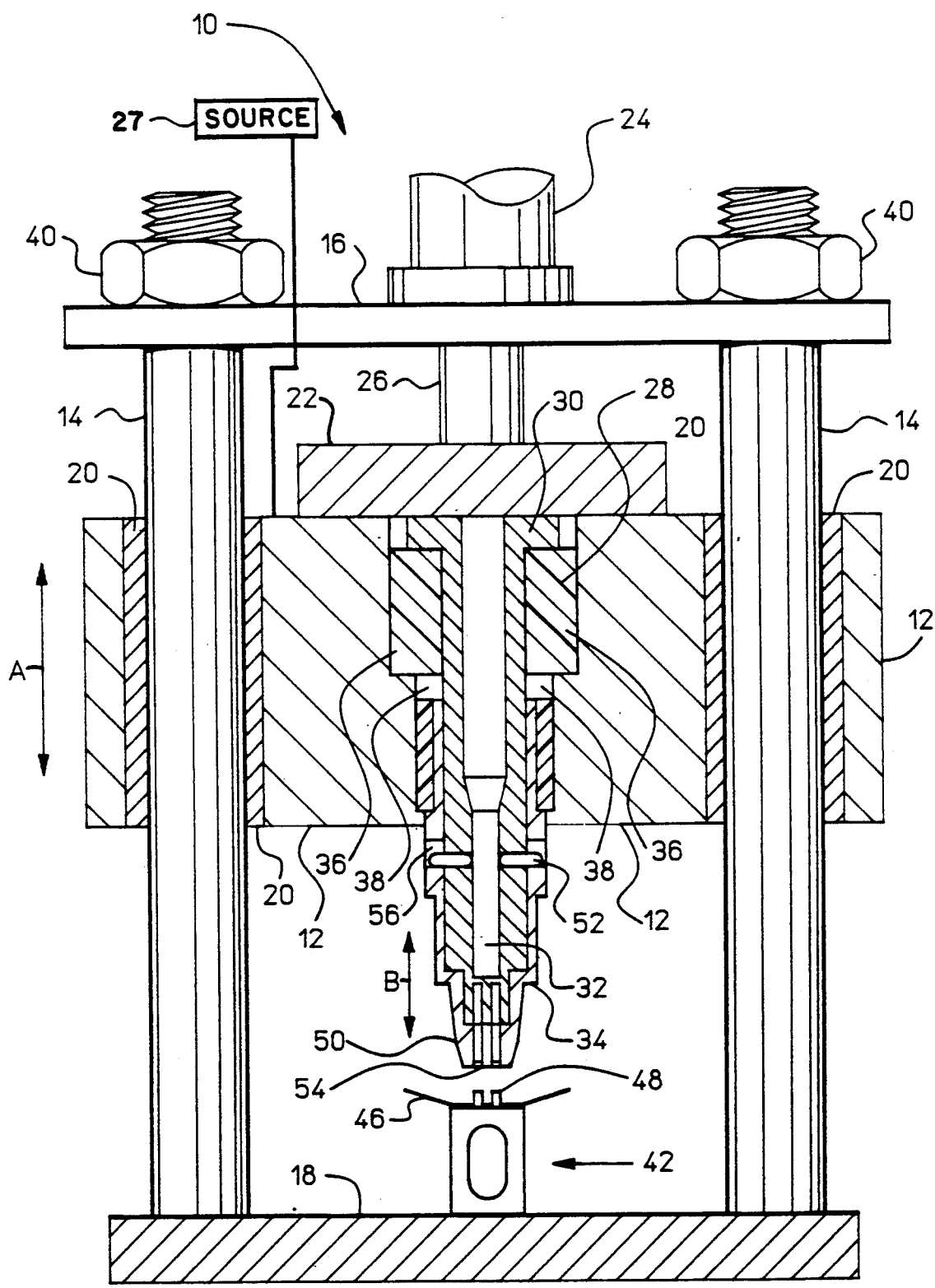
FIG. 1 is a partial cross-sectional view of a heat staking press in accord with the present invention.

Referring to FIG. 1, a staking press assembly 10 is shown to include a tip assembly housing 12 which rides on guideposts 14. The staking press assembly 10 is of generally conventional design wherein the tip assembly is movable in a direction indicated by arrow A between a top plate 16 and a base plate 18. Bushings 20 are used to facilitate movement of the tip assembly along the guideposts 14. The top plate 16 is secured to the guideposts 14 by threaded fasteners 40. A pneumatic device or other motive means may be used to provide the motion indicated by arrow A. In the embodiment shown a high pressure air cylinder 24 is used to provide pneumatic control of the tip assembly as is described more fully below.

The tip assembly is designed to contain an electrical heating element 32 within a steel heater core 30. The heater core 30 contains two precision-ground steel pressure pins 50 located at one end which are intended to transmit force from the press directly to the plastic studs to be welded. It is important that the heater core 30 have sufficient thermal mass so that the temperature of the pressure pins 50 remains within a range which will cause thermal plastic to melt. The opposite end of the heater core 30 is thermally insulated from the tip housing 12 by a plastic bushing 28 preferably made of TORLON, a polyamidemide resin filled for molding purpose. TORLON is a trademark owned by AMOCO Chemicals Corp. This portion of the tip assembly locks into the bottom of a counterbore in the tip housing and moves only as the tip housing is driven by the high-pressure air cylinder 24.

The lower portion of the tip assembly comprises a sleeve 34 which fits over the heater core 30. This sleeve, known as the sealing sheath contains two precision bored holes 54 through which the pressure pins 50 of the heater core fit and move. The sealing sheath 34 has its own TORLON thermal insulator 36 which also serves as a pneumatic seal.

As an illustrative example, an edge line microwave switch component 42 is positioned on the work surface of base plate 18. This component has two thermal-plastic studs 48 which extend through apertures in a metal jumper 46, the details of which are best seen in relation to FIGS. 2 and 3. The holes 54 in the sealing sheath 34 are designed to correspond to and receive the plastic studs 48. The number of holes and pressure pins in the tip can be any number depending on the particular application.

In operation, the entire tip assembly is moved pneumatically by application of air pressure from the air cylinder 24 which drives a piston 26. A variable source of air pressure either from the air cylinder 24 or from another source 27 is introduced through the tip housing 12 via bore holes into an area 38 just behind the insulator 36 so that the outer sealing sheath 34 is pressed downward independently of the inner heater core 30 in the direction indicated by arrow B. To prevent the sealing sheath from being blown off the heater core when air pressure is applied, two dowel pins 52 which extend into slots 56 are used to restrain the sealing sheath at its fully extended lower position. The steps of the weld cycle are discussed more fully below.

FIGS. 2A-2C illustrate generally the operation of the tip assembly during the weld cycle. As shown in FIG. 2A, the tip assembly is brought into position relative to the switch component 42 by movement of the press assembly as indicated by arrow C. When the tip has reached a position near enough to the component 42 air pressure is applied so that the sealing sheath 34 becomes fully extended and seals around the plastic studs 48, as shown in FIG. 2B and indicated by arrows D. At this point the sealing sheath does not have to completely seal around the posts, i.e. there may be a small space between the sheath and the jumper 46. As noted previously, the movement of the sealing sheath 34 is restrained by the dowel pins 52. FIG. 2C shows the press assembly driving the heater core and pressure pins 50 downward toward the plastic studs in the direction indicated by arrow E. The sealing sheath 34 remains sealed around the studs due to the air pressure provided in the tip assembly. If there was a small gap between the sheath and jumper this gap is now eliminated. During FIGS. 2B and 2C the hot pressure pins 50 come into contact with the plastic studs 48 and begin to melt them, thereby starting the process of forming weld caps.

Figure 3A:
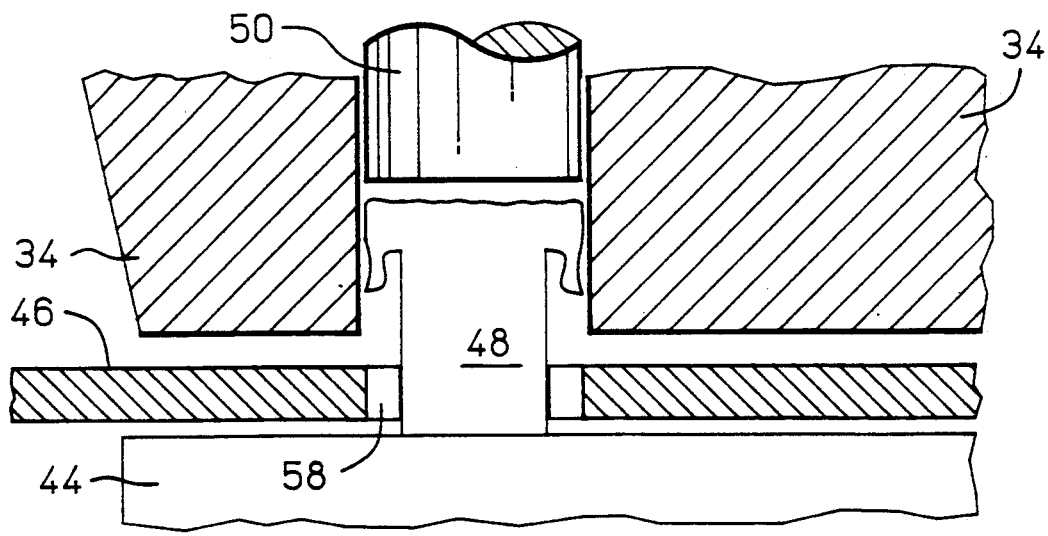
FIGS. 3A-C are enlarged cross-sectional views of a pressure pin and plastic stud of FIGS. 2A-C, which further illustrate the operation of the heat staking tip.
Figure 3B:
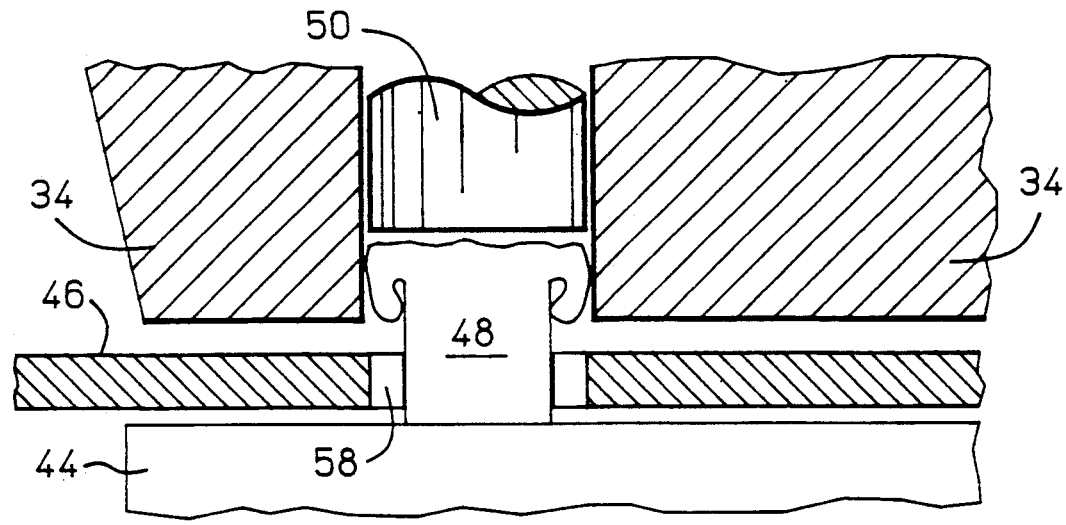
Figure 3C:
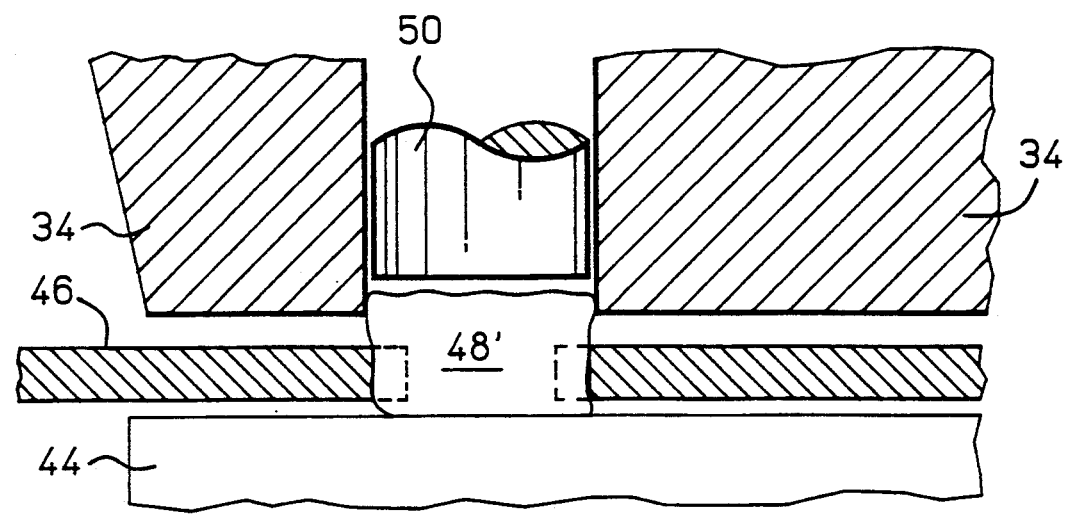

FIGS. 3A-3C show the formation of the weld cap. In FIG. 3A as the hot pressure pin 50 touches the top of the plastic stud 48, the plastic melts and shoots sideways in all directions until the flow hits the side walls of the sealing sheath 34. The sealing sheath redirects the melted plastic down its walls. As the weld cycle continues in FIG. 3B, more plastic is melted off the stud and the sealing sheath 34 preferably comes into contact with the jumper surface 46 (if it has not previously) where it applies a constant sealing pressure generated by the air pressure within the tip mechanism. As the weld cycle ends, as shown in FIG. 3C, the pressure pin 50 is thrust down by the full force of the press assembly. This action packs the molten plastic into the gap ring 58, which is the area inside the jumper hole and the plastic stud. The final result is a squat can profile weld plug 48'. The weld plug 48' inherently seals in glass fibers on or near the stud surface, since a layer of pure plastic forms over the surface of the stud. Therefore, the troublesome glass fibers are encapsulated inside the core of the weld cap 48'.

I claim:

1. A heat staker tip for staking a formable post comprising:
    a sealing sheath body having a tip, the tip having an opening adapted for receiving a formable post, the sealing sheath body being movable relative to the formable post between a spaced apart position and a sealed position;
    first means for selectively providing said relative movement of the sealing sheath body with respect to the formable post;
    a heating core body disposed within the sealing sheath body and being slidable relative to the sealing sheath body, the heating core body generating sufficient heat to cause the formable post to soften;
    a pressure pin in thermal association with the heating core body and being movable within the opening of the sealing sheath body between a retracted position and an extended position relative to the sealing sheath body; and
    second means for selectively providing said movement of the pressure pin within the opening, said first means being operationally independent of said second means when said sealing sheath body is in said spaced apart position.

2. The device of claim 1 wherein said pneumatically-driven body.

3. The device of claim 2 wherein said pressure pin is fixed to said heating core body and wherein said heating core body is a second pneumatically-driven body.

4. The device of claim 1 further comprising means for limiting said sliding of said heating core body with respect to said sealing sheath body.

5. The device of claim 4 wherein said means for limiting comprises a pair of restraining pins extending from said heating core body into slots defined in the sealing sheath body.

6. The device of claim 1 further comprising a plurality of pressure pin and opening assemblies.

7. A tip assembly for staking a heat-formable member comprising:
    a sealing body having a first end having an opening to receive a heat-formable member therein, the sealing body being movable between a forward position and a sealed, rearward position;
    a pressure pin disposed within said opening;
    first displacement means for selectively moving said pressure pin relative to said heat-formable member;
    second displacement means for selectively moving said sealing body between said forward and rearward positions independently of said first displacement means, said selective movement of said sealing body being relative to said pressure pin and said heat-formable member; and
    heating means for providing thermal energy to said pressure pin for deforming said heat-deformable member.

8. The assembly of claim 7 wherein said first displacement means includes a first pneumatically-driven member and said second displacement means includes a second pneumatically-driven member.

9. The assembly of claim 8 wherein said second pneumatically-driven member is slidably coupled to said first pneumatically-driven member.

* * * * *